United States Patent
Zhang et al.

(10) Patent No.: US 10,635,859 B2
(45) Date of Patent: Apr. 28, 2020

(54) NATURAL LANGUAGE RECOGNIZING APPARATUS AND NATURAL LANGUAGE RECOGNIZING METHOD

(71) Applicant: VIA Technologies, Inc., New Taipei (TW)

(72) Inventors: Guo-Feng Zhang, Shanghai (CN); Jing-Jing Guo, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 199 days.

(21) Appl. No.: 15/867,747

(22) Filed: Jan. 11, 2018

(65) Prior Publication Data

US 2019/0114317 A1 Apr. 18, 2019

(30) Foreign Application Priority Data

Oct. 13, 2017 (CN) .......................... 2017 1 0951693

(51) Int. Cl.
*G06F 40/253* (2020.01)
*G06F 40/30* (2020.01)

(52) U.S. Cl.
CPC ............ *G06F 40/253* (2020.01); *G06F 40/30* (2020.01); *G06F 2207/025* (2013.01)

(58) Field of Classification Search
None
See application file for complete search history.

(56) References Cited

U.S. PATENT DOCUMENTS

| | | | |
|---|---|---|---|
| 9,607,435 B2 * | 3/2017 | Buron | G06T 15/10 |
| 10,366,690 B1 * | 7/2019 | Sarikaya | G06F 16/433 |
| 10,395,655 B1 * | 8/2019 | Kumar | G10L 15/1815 |
| 10,446,147 B1 * | 10/2019 | Moniz | G06F 40/30 |
| 10,482,904 B1 * | 11/2019 | Hardie | G10L 15/22 |
| 10,515,637 B1 * | 12/2019 | Devries | G10L 15/1822 |
| 2003/0154066 A1 * | 8/2003 | Tokuda | G06F 40/253 704/2 |
| 2003/0154070 A1 * | 8/2003 | Tokuda | G09B 19/06 704/9 |
| 2008/0162471 A1 * | 7/2008 | Bernard | G06F 17/2785 |
| 2010/0004923 A1 * | 1/2010 | Bogl | G06F 16/355 704/9 |
| 2010/0241418 A1 * | 9/2010 | Maeda | G10L 15/1815 704/9 |
| 2012/0179454 A1 * | 7/2012 | Kim | G06F 40/253 704/9 |

(Continued)

*Primary Examiner* — Thuykhanh Le
(74) *Attorney, Agent, or Firm* — JCIPRNET

(57) ABSTRACT

A natural language recognizing apparatus including an input device, a processing device and a storage device is provided. The input device is configured to provide a natural language data. The storage device is configured to store a plurality of program modules. The program modules include a grammar analysis module. The processing device executes the grammar analysis module to analyze the natural language data through a formal grammar model, and generate a plurality of string data. When at least one of the string data conforms to a preset grammar condition, the processing device judges the at least one of the string data is an intention data, and the processing device outputs a corresponding response signal according to the intention data. In addition, a natural language recognizing method is also provided.

12 Claims, 3 Drawing Sheets

(56) References Cited

U.S. PATENT DOCUMENTS

| | | | |
|---|---|---|---|
| 2012/0203543 A1* | 8/2012 | Folmer | G06F 16/90344 704/9 |
| 2012/0290289 A1* | 11/2012 | Manera | G06F 16/345 704/9 |
| 2013/0325442 A1* | 12/2013 | Dahlmeier | G06F 40/253 704/9 |
| 2014/0136564 A1* | 5/2014 | Lee | G06F 16/9535 707/769 |
| 2014/0236572 A1* | 8/2014 | Meshulam | G10L 15/18 704/9 |
| 2014/0316768 A1* | 10/2014 | Khandekar | G06F 16/3329 704/9 |
| 2015/0248397 A1* | 9/2015 | Burstein | G09B 5/00 704/9 |
| 2016/0042748 A1* | 2/2016 | Jain et al. | G10L 25/48 704/9 |
| 2016/0124936 A1* | 5/2016 | Wang | G06F 40/211 704/9 |
| 2016/0196334 A1* | 7/2016 | Bastide | G06F 16/2465 707/776 |
| 2016/0314113 A1* | 10/2016 | Moharrami | G06F 40/284 |
| 2016/0350320 A1* | 12/2016 | Sung | G10L 15/19 |
| 2016/0379629 A1* | 12/2016 | Hofer | G10L 15/083 704/257 |
| 2017/0220578 A1* | 8/2017 | Kazi | G06F 16/9535 |
| 2017/0308589 A1* | 10/2017 | Liu | G06Q 50/01 |
| 2018/0032930 A1* | 2/2018 | Kolb | G06F 16/9024 |
| 2018/0052842 A1* | 2/2018 | Hewavitharana | G06F 40/232 |
| 2018/0052885 A1* | 2/2018 | Gaskill | G06N 5/04 |
| 2018/0068031 A1* | 3/2018 | Hewavitharana | G06F 16/3329 |
| 2018/0150552 A1* | 5/2018 | Wang | G06F 40/211 |
| 2018/0190274 A1* | 7/2018 | Kirazci | G10L 15/1815 |
| 2018/0308487 A1* | 10/2018 | Goel | G10L 15/1815 |
| 2019/0012714 A1* | 1/2019 | Bright | G06Q 30/0617 |
| 2019/0018663 A1* | 1/2019 | Wason | G06F 8/75 |

\* cited by examiner

NATURAL LANGUAGE RECOGNIZING APPARATUS AND NATURAL LANGUAGE RECOGNIZING METHOD

CROSS-REFERENCE TO RELATED APPLICATION

This application claims the priority benefit of China application serial no. 201710951693.6, filed on Oct. 13, 2017. The entirety of the above-mentioned patent application is hereby incorporated by reference herein and made a part of this specification.

BACKGROUND OF THE INVENTION

Field of the Invention

The invention is related to a natural language recognizing technology, and particularly to a natural language recognizing apparatus and a natural language recognizing method using Noam Chomsky formal grammar model expansion.

Description of Related Art

In the technical field of natural language recognition, generally a grammar model is used to analyze the natural language data provided by user to acquire whether there is any intention or key information in a sentence of natural language. However, conventional natural language recognizing method is performed by analyzing the natural language data through a formal grammar. After syntactical analysis, a complicated process of lexicon analysis needs to be performed to explicitly acquire the intention or key information of the sentence. That is to say, conventional natural language recognizing apparatus requires a large amount of data processing calculation and storage of a large amount of analysis logic modules to perform natural language recognition effectively. In view of the foregoing, it is an important to solve the issue of how to provide a process with simplified lexicon analysis to accurately perform natural language recognition so as to improve performance of natural language recognizing apparatus.

SUMMARY OF THE INVENTION

The invention provides a natural language recognizing apparatus and a natural language recognizing method, which are capable of efficiently analyzing natural language data to acquire a plurality of string data, and accurately determining whether there is intention data that conforms to a preset valid grammar condition in the plurality of string data.

In the invention, the natural language recognizing apparatus includes an input device, a storage device and a processing device. The input device provides a natural language data. The storage device stores a plurality of program modules. The plurality of program modules include a grammar analysis module. The processing device is coupled to the input device and the storage device. The processing device receives the natural language data and executes the plurality of program modules. The processing device executes the grammar analysis module to analyze the natural language data through a formal grammar model and generates a plurality of string data. When the processing device determines that at least one of the plurality of string data conforms to a preset valid grammar condition, the processing device determines that at least one of the string data is an intention data. The processing device outputs a corresponding response signal according to the intention data.

According to an embodiment of the invention, the formal grammar model includes a variable symbol, a terminal symbol, a grammar rule, a start symbol and a modifier symbol. The processing device generates the plurality of string data according to the variable symbol, the terminal symbol, the grammar rule, the start symbol and the modifier symbol by executing the grammar analysis module.

According to an embodiment of the invention, the plurality of modules further include a semantic analysis module. The processing device executes the semantic analysis module to analyze the plurality of string data. The semantic analysis module determines that at least one of the plurality of string data that conforms to description of modifier symbol is the intention data.

According to an embodiment of the invention, the modifier symbol is a global modifier symbol. When the processing device determines that the at least one of the plurality of string data conforms to the description of modifier symbol, the processing device determines that the at least one of the string data is the intention data.

According to an embodiment of the invention, the modifier symbol is a slot modifier symbol. When the processing device determines that at least one of a portion of the plurality of string data generated according to the variable symbol conforms to the description of the modifier symbol, the processing device determines that the at least one of the portion of the plurality of string data is the intention data.

According to an embodiment of the invention, the intention data includes an additive intention data corresponding to the at least one of the portion of the plurality of string data generated according to the variable symbol.

According to an embodiment of the invention, the formal grammar model further includes a multiplex rule. The multiplex rule is applied to the grammar rule to replace the variable in the grammar rule.

A natural language recognizing method of the invention is adapted to a natural language recognizing apparatus. The natural language recognizing apparatus includes an input device and a storage device, and the storage device stores a plurality of modules. The natural language recognizing method includes the following steps: receiving a natural language data by using the input device and executing the plurality of modules; analyzing the natural language data through a formal grammar model by executing a grammar analysis module and generating a plurality of string data; and when at least one of the plurality of string data conforms to a preset valid grammar condition, determining that at least one of the string data is an intention data, and outputting a corresponding response signal according to the intention data.

According to an embodiment of the invention, the formal grammar model includes a bearable symbol, a terminal symbol, a grammar rule, a start symbol and a modifier symbol. The step of analyzing the natural language data through the formal grammar model by executing the grammar analysis module and generating the plurality of string data includes generating the plurality of string data based on the variable symbol, the terminal symbol, the grammar rule, the start symbol and the modifier symbol by executing the grammar analysis module.

According to an embodiment of the invention, when at least one of the plurality of string data conforms to a preset valid grammar condition, the step of determining that at least one of the string data is the intention data includes: analyzing the plurality of string data by executing a sematic analysis module, wherein the semantic analysis module determines that at least one of the plurality of string data that conforms to description of the modifier symbol is the intention data.

According to an embodiment of the invention, the modifier symbol is a global modifier symbol. When the at least one of the plurality of string data conforms to a preset valid grammar condition, the step of determining that the at least one of the string data is the intention data includes: analyzing the plurality of string data by executing the semantic analysis module, wherein the semantic analysis module determines that at least one of the plurality of string data that conforms to the description of the modifier symbol is the intention data.

According to an embodiment of the invention, the modifier symbol is a global modifier symbol. When the at least one of the plurality of string data conforms to a preset valid grammar condition, the step of determining that the at least one of the string data is the intention data includes: when the at least one of the plurality of string data conforms to description of the modifier symbol, determining that the at least one of the string date is the intention data.

According to an embodiment of the invention, the modifier symbol is a slot modifier symbol. When the at least one of the string data conforms to a preset valid grammar rule, the step of determining that the at least one of the string data is the intention data includes: when it is determined that the at least one of a portion of the plurality of string data generated according to the variable symbol conforms to description of the modifier symbol, determining that the at least one of the portion of the plurality of string data is the intention data.

According to an embodiment of the invention, the intention data includes an additive intention data corresponding to at least one of the portion of the plurality of string data generated according to the variable symbol.

According to an embodiment of the invention, the formal grammar model further includes a multiplex rule. The step of analyzing the natural language data through a formal grammar model by executing the grammar analysis module and generating a plurality of string data includes: applying the multiplex rule to the grammar rule to replace the variable in the grammar rule.

According to the above-mentioned embodiments, the natural language recognizing apparatus and the natural language recognizing method of the invention are capable of efficiently analyzing the natural language data provided by the user through the formal grammar model, and accurately determining whether there is intention data that conforms to the preset valid grammar rule in the plurality of string data to output a corresponding response signal.

In order to make the aforementioned features and advantages of the disclosure more comprehensible, embodiments accompanying figures are described in detail below.

DESCRIPTION OF EMBODIMENTS

Figure 1:
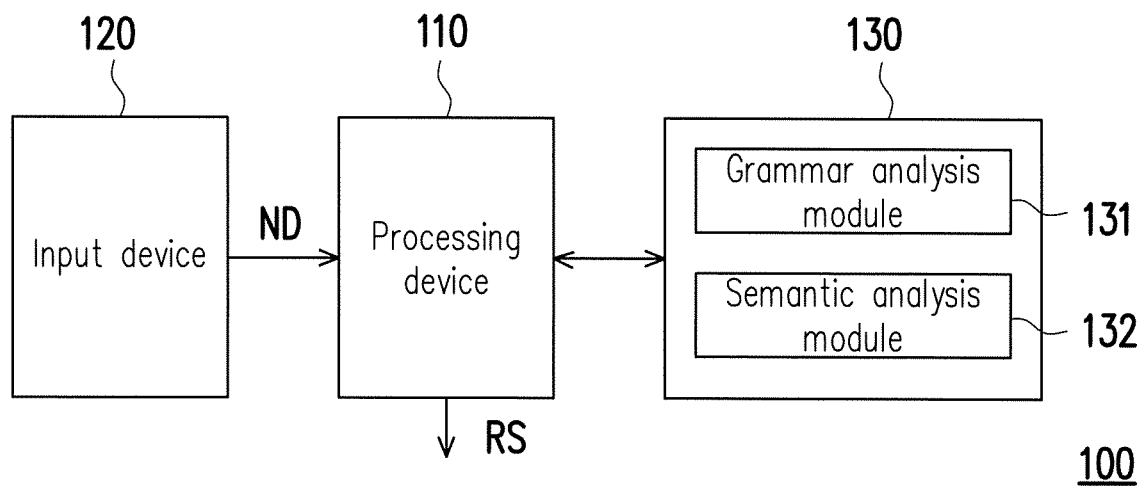
FIG. 1 is a schematic view of a natural language recognizing apparatus according to an embodiment of the invention.

In order to make the disclosure more comprehensible, embodiments are described below as the examples to prove that the disclosure can actually be realized. In addition, wherever possible, elements/components/steps denoted by the same reference numerals in drawings and embodiments represent the same or similar parts.

FIG. 1 is a schematic view of a natural language recognizing apparatus according to an embodiment of the invention. Referring to FIG. 1, in the embodiment, a natural language recognizing apparatus 100 includes a processing device 110, an input device 120 and a storage device 130. The processing device 110 is coupled to the input device 120 and the storage device 130. The storage device 130 includes a grammar analysis module 131 and a semantic analysis module 132. In the embodiment, the input device 120 may provide a natural language data ND to the processing device 110. In the meantime, the processing device 110 analyzes the natural language data ND by executing the grammar analysis module 131 and the semantic analysis module 132 stored in the storage device 130. In the embodiment, the processing device 110 may analyze the natural language data ND via the grammar analysis module 131 and the semantic analysis module 132 to determine whether the analysis result of the natural language data ND includes an intention data that conforms to a valid grammar condition. That is to say, after being analyzed by the semantic analysis module 132, if the semantic analysis module 132 analyzed that the valid grammar information corresponds to a specific application function, the processing device 110 determines that the natural language data ND includes the intention information, and outputs a corresponding response signal RS.

In the embodiment, the input device 120 is, for example, a keyboard, a voice receiver or a microphone and the like; the input device 120 may be configured to receive the voice or input operation provided by the user, which should not be construed as a limitation to the invention. In the embodiment, the input device 120 may provide the natural language data ND according to the above-mentioned input in various forms, wherein the natural language data ND belongs to a text data, and the content thereof may be, for example, a sentence or a phrase and so on. However, in an embodiment, the input device 120 may be coupled to an external electronic device to receive the natural language data ND provided by the user, and provide the natural language data ND to the processing device 110.

In the embodiment, the processing device 110 is, for example, a central processing unit (CPU), a system on chip (SOC) or other programmable general purpose or special purpose microprocessor, a digital signal processor (DSP), a programmable controller, an application specific integrated circuit (ASIC), a programmable logic, device (PLD), other similar processing device or a combination thereof. It should be indicated that, in the embodiment, the processing device 110 includes a compiler, wherein the complier may be configured to execute various natural language processing operation described in each of the embodiments of the invention.

In the embodiment, the storage device 130 is, for example, a dynamic random access memory (DRAM), a flash memory or a non-volatile random access memory (NVRAM) and so on. In the embodiment, the storage device 130 stores the data and program module described in each of the embodiments of the invention, and the processing device 110 may read the data and program module to execute the same so that the natural language recognizing apparatus 100 of the invention can realize the natural language recognizing operation described in each of the embodiments of the invention.

Figure 2:
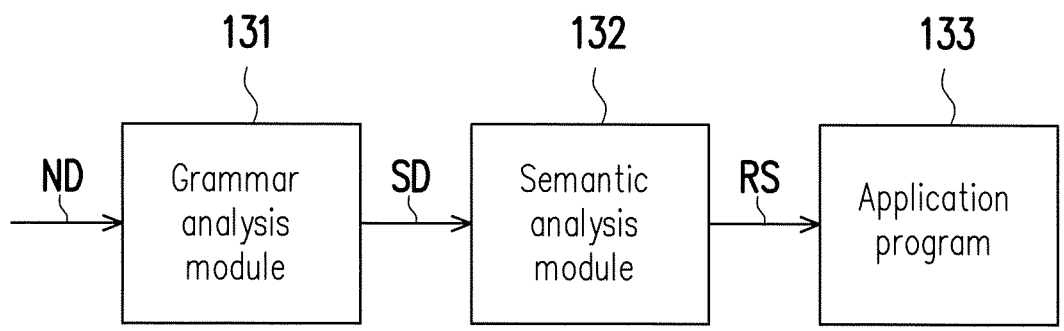
FIG. 2 is a schematic view of a natural language processing process according to an embodiment of the invention.

FIG. 2 is a schematic view of a natural language processing process according to an embodiment of the invention. Referring to FIG. 1 and FIG. 2, in the embodiment, the processing device 110 may read the grammar analysis module 131 and semantic analysis module 132 stored in the storage device 130. Specifically, first of all, the processing device 110 receives the natural language data ND via the input device 120, and analyzes the natural language data ND via the grammar analysis module 131 to analyze the natural language data ND through the formal grammar model, and generates a plurality of string data SD. Thereafter, the processing device 110 analyzes the plurality of string data SD via the semantic analysis module 132 to respectively determine whether the plurality of string data conforms to the preset valid grammar condition. In the embodiment, the processing device 110 may generate the corresponding response signal RS to the application program 133 according to the string data that conforms to the preset valid grammar condition, so that the application program 133 can perform a corresponding feedback operation. In other words, in the embodiment, when at least one of the plurality of string data conforms to the description of the modifier symbol, the semantic analysis module 132 determines that the string data that conforms to the description of modifier symbol is an intention data, and the processing device 110 outputs the corresponding response signal RS to the application program 133 according to the intention data.

Figure 3:
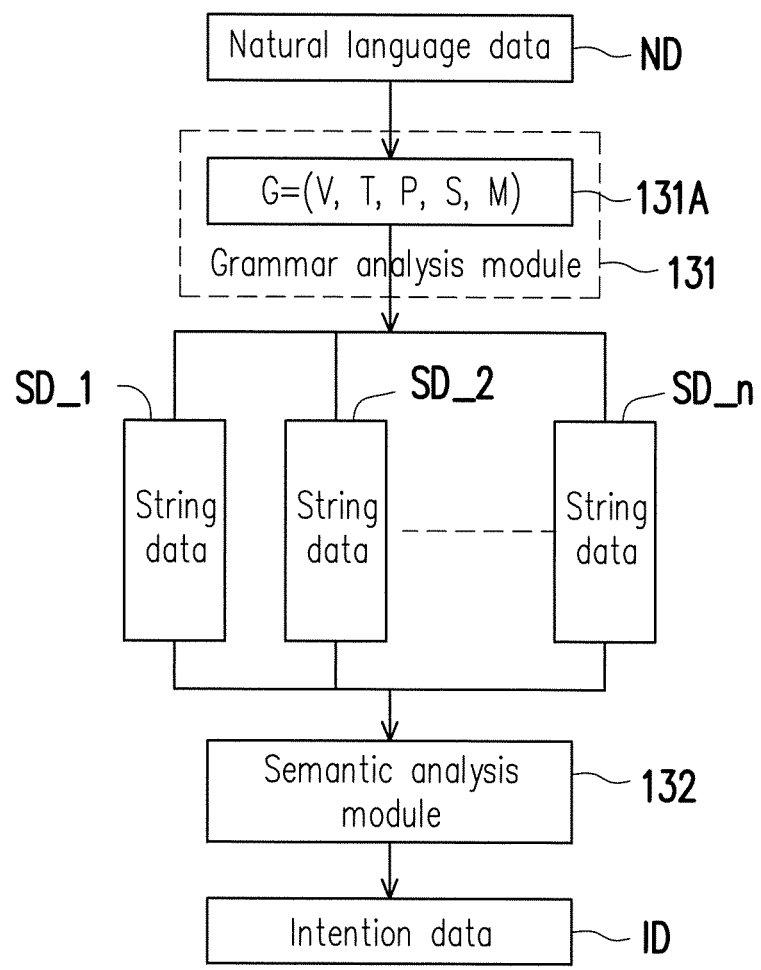
FIG. 3 is a schematic view illustrating analysis of a natural language data according to an embodiment of the invention.

FIG. 3 is a schematic view illustrating analysis of a natural language data according to an embodiment of the invention. Referring to FIG. 1 and FIG. 3, in the embodiment, the processing device 110 performs grammar analysis on the natural language data ND by receiving the natural language data ND provided by the input device 120 and executing the grammar analysis module 131 stored in the storage device 130. In the embodiment, a formal grammar model 131A belongs to a Noam Chomsky formal grammar model expansion, wherein the formal grammar model 131A may consist of five symbols. The symbols include a variable symbol (V), a terminal symbol (T), a grammar rule (P), a start symbol (S) and a modifier symbol (M). Moreover, the language generated by the formal grammar (G=(V, T, P, S, M)) is a set of a plurality of string data SD_1, SD_2-SD_n generated according to the rule of the symbols, wherein n is a positive integer larger than 0. That is to say, in the embodiment, the processing device 110 may generate the string data SD_1, SD_2-SD_n according to the variable symbol (V), the terminal symbol (T), the grammar rule (P), the start symbol (s) and the modifier symbol (M) by executing the grammar analysis module 131.

Specifically, after the natural language data ND is analyzed via the formal grimmer model 131A, the plurality of string data SD_1, SD_2-SD_n can be generated. The string data SD_1, SD_2-SD_n may be constructed by characters respectively represented by the variable symbol (V) and the terminal symbol (T), wherein the characters are modified by the modifier symbol (M) and obtained via the start symbol (S) that starts to keep applying grammar rule (P) that generates rules. However, the invention provides no limitation to the type of the formal grammar model 131A, wherein the grammar classification method of the formal grammar model 131A may be applied via, for example, an unrestricted grammar, a context sensitive grammar, a context free grammar or a regular grammar and so on.

In the embodiment, the modifier symbol (M) may consist of Chinese characters or English characters with an underscore. If the modifier symbol (M) is an English character, it begins with an underscore or a letter. In the embodiment, the modifier symbol (M) may be a global modifier or a slot modifier. In the embodiment, the processing device 110 may determine whether the string data SD_1, SD_2-SD_n include the string data that conforms to description of the modifier symbol (M) by executing the semantic analysis module 132. Moreover, the processing device 110 regards the string data that conforms to description of the modifier symbol (M) as an intention data ID.

In order for persons skilled in the art to further understand the natural language recognizing technology described in the invention, two exemplary embodiments in which the modifier symbol (M) belongs to a global modifier are provided below with reference to FIG. 1 and FIG. 3.

In an exemplary embodiment, the processing device 110 may set the modifier symbol (M) as a global modifier, and the modifier symbol (M) may be defined as querydate. The defining symbol for the modifier symbol (M) is "@", and a linking symbol for a plurality of modifier symbols (M) is "&". First of all, the user may provide a natural language data ND such as "inquire today's date, inquire today's time" via the input device 120, and the input device 120 provides the natural language data ND to the processing device 110. Next, the processing device 110 can execute the grammar analysis module 131 to analyze the natural language date ND through the formal grammar model 131A to acquire a formal grammar (G) having the plurality of string data SD_1, SD_2-SD_n.

In the example, the formal grammar may be (G=({<sentence>, <verb>, <time noun>, <modal verb>, <date noun>}, {date, time, today, of, inquire, check, find out, search}, P, <sentence>, G@=querydate)), wherein P={<verb>: inquire search find out check, <date time>: date time, <time noun>: today, <modal verb>: of, <sentence>; <verb><time noun><modal verb><time noun>}.

Thereafter, the processing device 110 executes the semantic analysis module 132 to analyze the string data SD_1, SD_2-SD_n generated based on the formal grammar (G). In the example, the processing device 110 can determine whether the string data SD_1, SD_2-SD_n generated based on the formal grammar (G) includes the string data that conforms to modifier symbol (G@=querydate) and time noun. In other words, if the processing device 110 determines that the string data includes the string data that conforms to the querydate that describes "find out, search" and time noun "today", the processing device 110 directly defines that the string data is the intention data ID. Accordingly, the processing device 110 can output the corresponding response signal RS according to the intention data ID.

It should be mentioned that, in the example, the processing device 110 may, for example, output the corresponding response signal RS to a specific application program so that the specific application program can execute a corresponding operation according to the response signal RS. Alternatively, the processing device 110 may, for example, output the corresponding response signal RS to a natural language search engine to respond to the user's query via a voice broadcasting device, which should not be construed as a limitation to the invention.

In another exemplary embodiment, the processing device 110 may set the modifier symbol (M) as a global modifier, and the modifier symbol (M) may be defined as a querydate. The defining symbol for the modifier symbol (M) is "@", and the linking symbol for the plurality of modifier symbols (M) is "&". First of all, the user may provide the natural language data ND such as "what date is it today, what is the date today, what day is today" via the input device 120, and the input device 120 provides the natural language data ND to the processing device 110. Thereafter, the processing device 110 can execute the grammar analysis module 131 to analyze the natural language data ND through the formal grammar model 131A to acquire the formal grammar (G) having the plurality of string data SD_1, SD_2-SD_n.

In the example, the formal grammar may be (G={<time noun, <noun 1>, <noun 2>, <phrase 1>, <phrase 2>, <sentence>}, {today, what, what, date, what day}, P, <sentence>, G@=querydate)), wherein P={<time noun>: today, <noun 1>whatǀwhat, <noun 2>: date, <phrase 1>: what day, <phrase 2>: <noun 1><noun 2>, <sentence>: <time noun><phrase 1>, <sentence>; <time noun><phrase 2>}.

Thereafter, the processing device 110 executes the semantic analyses module 132 to analyze the string data SD_1, SD_2-SD_n generated based on the formal grammar (G). In the example, the processing device 110 can determine whether the string data SD_1, SD_2-SD_n generated according to the formal grammar (G) include the string data that conforms to the modifier symbol (G@=querydate) and the time noun. That is to say, if the processing device 110 determines that the string data includes the string data that conforms to the querydate that describes "what date", "what date", "what day" and time noun "today", the processing device 110 directly defines that the string data is the intention data ID. Accordingly, the processing device 110 can output the corresponding response signal RS according to the intention data ID.

In order for persons skilled in the art to further understand the natural language recognizing technology described in the invention, two exemplary embodiments in which the modifier symbol (M) belongs to a slot modifier are provided below with reference to FIG. 1 and FIG. 3.

In an exemplary embodiment, the processing device 110 may set the modifier symbol (M) as a slot modifier, wherein the modifier symbol (M) may modify variable in grammar. Specifically, since different variables in the same grammar may respectively correspond to different operation intentions, the processing device 110 in the embodiment modifies the variable in grammar via the modifier symbol (M). First of all, the user may provide the natural language data ND such as "turn on TV, turn on air conditioning, turn on purifier" via the input device 120, and the input device 120 provides the natural language data ND to the processing device 110. Then, the processing device 110 can execute the grammar analysis module 131 to analyze the natural language data ND through the formal grammar model 131A to acquire the formal grammar (G) having the plurality of string data SD_1, SD_2-SD_n.

In the example, the formal grammar may be (G= ({<verb>, <noun 1>, <noun 2>, <noun 3>, {turn on, switch on, open}, P, <sentence>, {<noun 1>@=open, <noun 2>G@=open & lowlevel, <noun 3>@=open & highlevel)), wherein P={<verb>: turn on switch on open, <noun 1>: TV television, <noun 2>: air conditioning, <noun 3>: purifier, <sentence>: <verb><noun 1>, <sentence>: <verb><noun 2>, <sentence>: <verb><noun 3>}.

Then, the processing device 110 executes the semantic analysis module 132 to analyze the string data SD_l, SD_2-SD_n generated according to the formal grammar (G). In the example, the processing device 110 can retrieve "open" as the modifier symbol for the string "TV" generated according to the formal grammar (G); therefore, the processing device 110 can output the corresponding response signal RS to an external electronic device or TV to turn on the TV. Moreover, the processing device 110 can retrieve "open" and "lowlevel" as the modifier symbol for the string "air conditioning" generated according to the formal grammar (G), and the processing device 110 can output the corresponding response signal RS to the external electronics device or air conditioning to turn on the air conditioning and switch the air conditioning to the lowest level. Furthermore, the processing device 110 can retrieve "open" and "highlevel" as the modifier symbol for the string "purifier" generated according to the formal grammar (G), and the processing device 110 can output the corresponding response signal RS to the external electronic device or purifier to turn on the purifier and switch the purifier to the highest level.

That is to say, in the example, the processing device 110 may only determine the plurality of string data SD_1, SD_2-SD_n generated according to the variable symbol (V) to define the string data that conforms to the modifier symbol (M) description and generated according to the variable symbol (V) to be the intention data ID. Meanwhile, the processing device 110 may add an additive intention data in the intention data ID, and the additive intention may correspond to the string data generated based on the variable symbol (V) with a special meaning. That is to say, the modifier symbol (M) may add intention description in corresponding to different sentences generated according to the formal grammar (G) according to the processing device 110 or the function set by the user.

In another exemplary embodiment, the user may provide the natural language data ND such as "turn on TV, turn on air conditioning, turn on purifier" via the input device 120, and the input device 120 provides the natural language data ND to the processing device 110. Thereafter, the processing device 110 can execute the grammar analysis module 131 to analyze the natural language data ND through the formal grammar model 131A to acquire the formal grammar (G) having the plurality of string data SD_1, SD_2-SD_n.

In the example, the formal grammar may be (G= ({<verb>, <noun 1>, <noun 2>, <noun 3>}, {turn on, switch on, open}, P, <sentence>, {<noun 1>@=open, <noun 2>G@=open, <noun 3>@=open}), wherein P={<verb>: turn on switch on open, <noun 1>: TV television, <noun 2>: air conditioning, <noun 3>: purifier, <sentence>: <verb><noun 1>, <sentence>: <verb><noun 2>, <sentence>: <verb><noun 3>}.

Thereafter, the processing device 110 executes the semantic analysis module 132 to analyze the string data SD_1, SD_2-SD_n generated according to the formal grammar (G). In the example, the processing device 110 may retrieve "open" as the modifier symbol for the strings "TV", "air conditioning" and "purifier" generated according to the formal grammar (G); therefore, the processing device 110 can output the corresponding response signal RS to the external electronic device or TV, air conditioning and purifier to turn on the TV, air conditioning and purifier.

In other words, in the example, the processing device 110 may only determine the plurality of string data SD_1, SD_2-SD_n generated according to the variable symbol (V) to define the string data that conforms to the modifier symbol (M) description and is generated according to the variable symbol (V) to be the intention data ID. However, in the example, since the processing device 110 does not add any additive intention data to the intention data ID, the processing device 110 merely determines whether the natural language data ND includes the intention data having the modifier symbol "open". That is to say, the example may apply the approach of the global modifier to determine the intention data.

It should be noted that, in each of the exemplary embodiments regarding the global modifier and slot modifier, the natural language recognizing apparatus 100 can further improve grammar compiling and maintaining efficiency via a multiplex method of the modifier symbol (M). Specifically, if the natural language recognizing apparatus 100 needs to make determination for two different variables, the grammar rule (P) may need to respectively define the rules corresponding to the two different variables so that the semantic analysis module 132 can analyze whether the natural language data ND conforms to the preset valid grammar condition regarding the two different variables. However, in an embodiment, the formal grammar model 131A may further include a multiplex rule, wherein the multiplex rule may be applied to the grammar rule (P) to replace the variable (V) in the grammar rule.

Specifically, if the grammar rule (P) includes a rule (<generalcontrol>: open <V1@open>|close<V2@close>), wherein V1 represents a variable for matching a general apparatus name. The rule <p1> is, for example, used for controlling the grammar of the general apparatus, such as "turn on light", "turn on air conditioning", "turn off TV". However, in the example, if it is desired to add the same rule <generalcontrol> adapted to another variable V2, a multiplex rule may be adopted to define a grammar rule to be (<p1>: open <@open>|close <@close>), and define <generalcontrol>:<p1:V1>, and <controlcurtain>:<p1:V2>|pull open<V2@open>|pull up<V2@close>. In other words, the <generalcontrol> may be, for example, the grammar used for "turn on light", "turn on air conditioning" or "turn off TV", and "controlcurtain" may be, for example, the grammar used for controlling curtain. Therefore, the grammar rule (P) in the embodiment may include general grammar as well as special grammar, and there is no need to repeatedly define a plurality of grammar rules so as to avoid redundant grammar rules. Moreover, the multiplex rule may be applied to each of the exemplary embodiments regarding the global modifier and slot modifier.

Furthermore, in the multiplex rule, if the general grammar needs to be amended, it would be sufficient to amend only the <p1>. For example, the multiplex rule may be, for example, a single variable replacement <p1:V>, wherein p1 is a grammar rule that requires multiplex use, and V is used to replace the variable in p1. In another example, the multiplex rule may be, for example, a plurality of variable replacements <p1:V1=V, V2=V, . . . >, wherein p1 is a grammar rule that requires multiplex use, and p1 includes a plurality of variables V1, V2 . . . , and V is used to replace the variable in p1. Therefore, the grammar rule (P) in the embodiment may improve grammar compiling and maintaining efficiency by using the design of multiplex rule.

Figure 4:
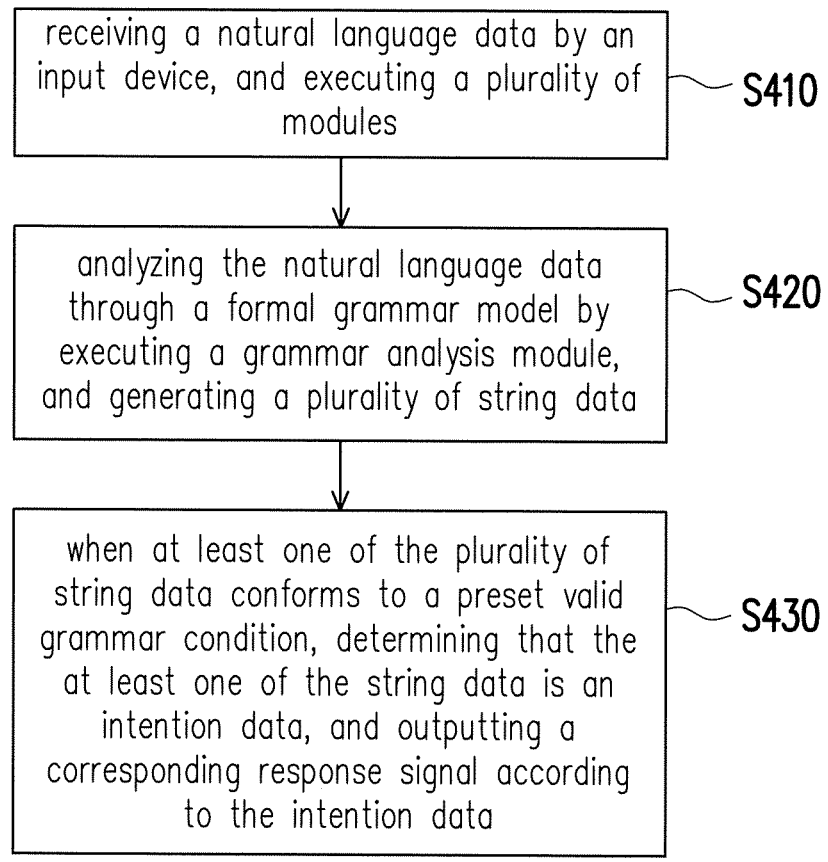
FIG. 4 is a flowchart illustrating a natural language recognizing method according to an embodiment of the invention.

FIG. 4 is a flowchart illustrating a natural language recognizing method according to an embodiment of the invention. Referring to FIG. 1, FIG. 3 and FIG. 4, the natural language recognizing method in the embodiment may be at least adapted to the natural language recognizing apparatus 100 in the embodiment of FIG. 1. In step S410, the processing device 110 receives the natural language data ND via the input device 120, and executes a plurality of modules. In step S420, the processing device 110 analyzes the natural language data ND through the formal grammar model 131A by executing the grammar analysis module 131, and generates a plurality of string data SD_1, SD_2-SD_n.

In step S430, when the processing device 110 determines that at least one of the string data SD_1, SD_2-SD_n conforms to the preset valid grammar condition, it is determined that at least one of the string data SD_1, SD_2-SD_n is the intention data ID, and the corresponding response signal RS is output to the application program according to the intention data ID. Therefore, the natural language recognizing method of the invention is capable of efficiently and accurately determining whether the natural language data provided by the user has intention data so that the natural language recognizing apparatus can correctly output the corresponding response signal.

In addition, sufficient teaching, suggestions and implementation regarding the implementation details and device feature of the natural language recognizing apparatus 100 in the embodiment can be derived from the embodiments in FIG. 1 to FIG. 3; thus, no further descriptions are incorporated herein.

In summary, according to the invention, the natural language recognizing apparatus and natural language recognizing method are capable of analyzing natural language data according to Noam Chomsky formal grammar model expansion, and accurately determining whether the analysis result of the natural language data includes information content that conforms to a specific intention to correspondingly output the response signal. Moreover, the natural language recognizing apparatus of the invention is further capable of adding an intention description to the intention data so that the natural language recognizing apparatus can correspondingly generate versatile responses according to different application program functions. Furthermore, the formal language model of the invention may further include the multiplex rule to effectively improve the compiling and maintaining efficiency of the formal grammar model by applying the multiplex rule to the grammar rule.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:
1. A natural language recognizing apparatus, comprising:
an input device, configured to provide a natural language data;
a storage device, configured to store a plurality of program modules, wherein the plurality of program modules comprise a grammar analysis module; and
a processing device, coupled to the input device and the storage device, the processing device receives the natural language data, and executes the plurality of program modules, wherein the processing device executes the grammar analysis module to analyze the natural language data through a formal grammar model and generates a plurality of string data,
wherein when the processing device determines that at least one of the plurality of string data conforms to a preset valid grammar condition, the processing device determines that the at least one of the string data is an intention data, and the processing device outputs a corresponding response signal according to the intention data,
wherein the formal grammar model comprises a variable symbol, a terminal symbol, a grammar rule, a start symbol and a modifier symbol, and the processing device generates the plurality of string data according to the variable symbol, the terminal symbol, the grammar rule, the start symbol and the modifier symbol by executing the grammar analysis module.

2. The natural language recognizing apparatus according to claim 1, wherein the plurality of program modules further comprise a semantic analysis module, and the processing device executes the semantic analysis module to analyze the plurality of string data, wherein the semantic analysis module determines that the at least one of the plurality of string data conforming to a description of the modifier symbol is the intention data.

3. The natural language recognizing apparatus according to claim 1, wherein the modifier symbol is a global modifier, and when the processing device determines that the at least one of the plurality of string data conforms to a description of the modifier symbol, the processing device determines that the at least one of the string data is the intention data.

4. The natural language recognizing apparatus according to claim 1, wherein the modifier symbol is a slot modifier, and when the processing device determines that the at least one of a portion of the plurality of string data generated according to the variable symbol conforms to a description of the modifier symbol, the processing device determines that the at least one of the portion of the plurality of string data is the intention data.

5. The natural language recognizing apparatus according to claim 4, wherein the intention data comprises an additive intention data corresponding to the at least one of the portion of the plurality of string data generated according to the variable symbol.

6. The natural language recognizing apparatus according to claim 1, wherein the formal grammar model further comprises a multiplex rule, and the multiplex rule is applied to the grammar rule to replace a variable in the grammar rule.

7. A natural language recognizing method, adapted for a natural language recognizing apparatus, wherein the natural language recognizing apparatus comprises an input device and a storage device, and the storage device stores a plurality of program modules, wherein the natural language recognizing method comprises:

receiving a natural language data by the input device, and executing the plurality of modules;

analyzing the natural language data through a formal grammar model by executing a grammar analysis module, and generating a plurality of string data; and when at least one of the plurality of string data conforms to a preset valid grammar condition, determining that the at least one of the string data is an intention data, and outputting a corresponding response signal according to the intention data, wherein the formal grammar model comprises a variable symbol, a terminal symbol, a grammar rule, a start symbol and a modifier symbol, wherein the step of analyzing the natural language data through the formal grammar model by executing the grammar analysis module and generating the plurality of string data comprises:

generating the plurality of string data according to the variable symbol, the terminal symbol, the grammar rule, the start symbol and the modifier symbol by executing the grammar analysis module.

8. The natural language recognizing method according to claim 7, wherein when the at least one of the plurality of string data conforms to the preset valid grammar condition, the step of determining the at least one of the string data is the intention data comprises:

analyzing the plurality of string data by executing a semantic analysis module, wherein the semantic analysis module determines that the at least one of the plurality of string data conforming to a description of the modifier symbol is the intention data.

9. The natural language recognizing method according to claim 7, wherein the modifier symbol is a global modifier, and when the at least one of the plurality of string data conforms to the preset valid grammar condition, the step of determining that the at least one of the string data is the intention data comprises:

when the at least one of the plurality of string data conforms to a description of the modifier symbol, determining that the at least one of the string data is the intention data.

10. The natural language recognizing method according to claim 7, wherein the modifier symbol is a slot modifier, and when the at least one of the plurality of string data conforms to the preset valid grammar condition, the step of determining the at least one of the string data is the intention data comprises:

when it is determined that the at least one of a portion of the plurality of string data generated according to the variable symbol conforms to a description of the modifier symbol, determining that the at least one of the portion of the plurality of string data is the intention data.

11. The natural language recognizing method according to claim 10, wherein the intention data comprises an additive intention data corresponding to the at least one of the portion of the plurality of string data generated according to the variable symbol.

12. The natural language recognizing method according to claim 7, wherein the formal grammar model further comprises a multiplex rule, and the step of analyzing the natural language data through the formal grammar model by executing the grammar analysis module and generating the plurality of string data comprises:

applying the multiplex rule to the grammar rule to replace a variable in the grammar rule.

* * * * *